United States Patent [19]

Darling

[11] 4,020,533
[45] May 3, 1977

[54] CLAMP

[76] Inventor: Myron E. Darling, 515 Ohio St., Webster City, Iowa 50595

[22] Filed: Sept. 3, 1976

[21] Appl. No.: 720,242

[52] U.S. Cl. ............................ 24/276; 24/135 L
[51] Int. Cl.² ...................................... F16L 33/10
[58] Field of Search ............ 24/277, 276, 275, 283, 24/135 L, 135 K, 115 P, 132 LS, 249 LL; 339/264

[56] References Cited
UNITED STATES PATENTS

| 1,145,292 | 7/1915 | Buck | 24/276 |
| 1,278,862 | 9/1918 | Cruchelon | 24/135 L |

Primary Examiner—Bernard A. Gelak
Attorney, Agent, or Firm—Henderson, Strom & Sturm

[57] ABSTRACT

A clamp adapted particularly for use with automobile exhaust systems formed completely of wire or small diameter rod stock. The clamp is comprised of three elements, the first member being a wire or rod having one end thereof formed in a loop along the first axis and the other end formed in a loop about a second axis perpendicular to the first axis. The second member has a loop formed on one end thereof which extends through the first loop on the first axis thereby forming a hinge structure and the other end of the second member is straight and is threaded and adapted to be selectively receivable through the second loop of the first member. The intermediate portions of the first and second members are partially circular for the purpose of engaging circular portions of exhaust pipes or the like. A conventional nut is provided for being threadedly received on the straight threaded portion of the second member for tightening the first and second members together with respect to each other.

1 Claim, 7 Drawing Figures

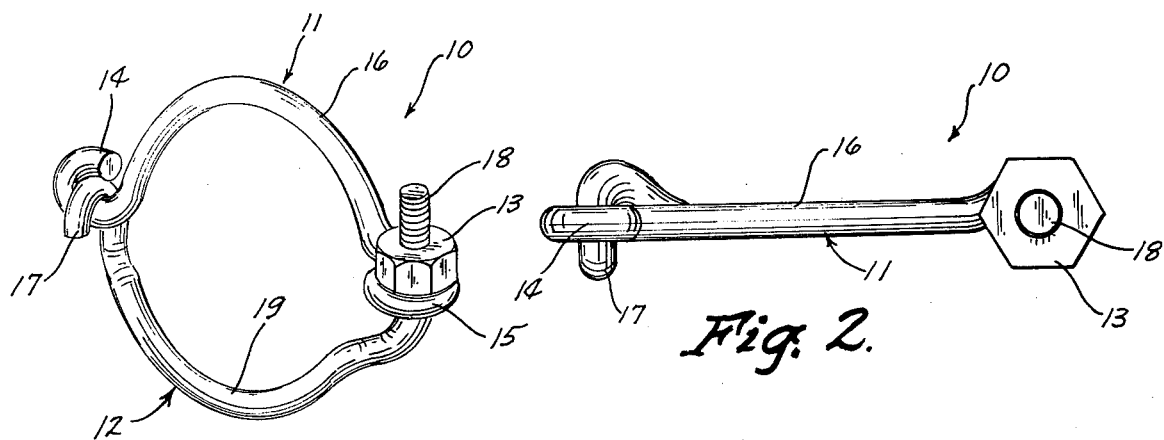

CLAMP

BACKGROUND OF THE INVENTION

The present invention relates generally to clamps and more particularly to clamps of a type for use in vehicular exhaust systems having internal combustion engines.

While there are a variety of clamps available commercially for the purpose of attaching various components of vehicular exhaust systems together, one style of clamp in particular is used more than any other type of clamp. This particular clamp which is in widespread use is comprised of a U-shaped rod member which is threaded on each end thereof. Another member formed of sheet metal has a pair of openings therein formed for reception of the threaded portions. The sheet metal member and the U-shaped rod member of this conventional clamp have arcuate portions thereon of the same general diameter as the particular diameter of the exhaust tubing to which they are to be applied.

To use this conventional clamp referred to above, two sections of exhaust tubing are telescoped together and then the U-shaped rod member is placed over this telecoping portion of the tubing, normally with the threaded portions of the U-shaped member extending generally downwardly because the vehicle is normally elevated when such assembly is being made. The sheet metal portion is then used such that the openings in the sheet metal portion are placed over the threaded portions of the U-shaped members and the arcuate portion of the sheet metal member is placed against the telescoping section of the tubing. An internally threaded member such as a nut is then screwed onto each of the threaded portions of the U-shaped rod member and these nuts are then tightened down such that the telescoping portions of the tubing are held firmly in place between the arcuate portion of the U-shaped member and the arcuate portion of the sheet metal portion of the clamp.

It can be appreciated that such assembly could be less time consuming if only one nut, instead of two, needed to be used, however, such is not possible with this type of conventional clamp. Furthermore, the production of such a clamp causes there to be a considerable amount of waste in the production of the sheet metal part of this clamp. Consequently, while there are disadvantages with this particular style of clamp, still there is considerable demand for it since it has apparently been the best clamp for the money in the industry up to this time.

Consequently, it is believed that there is a definite need for a reliable, and less expensive clamp which can be produced without any substantial waste of material and which can be simply and expeditiously installed.

SUMMARY OF THE INVENTION

The present invention relates to a clamp constructed primarily of wire or small diameter rod which can be constructed with virtually no waste of material. A first member of the clamp has a loop on one end thereof formed along the first axis and a second loop on the other end thereof formed along an axis perpendicular to the first axis. The intermediate portion of the first member includes a member formed arcuately about a third axis. A second member of the clamp has a loop on on end thereof which is received in the first loop of the first member for forming a hinge arrangement. The other end of the second member has a straight portion thereof which is externally threaded, and the intermediate portion of the second member is arcuated shaped along a diameter approximately the same as that arc of the intermediate portion of the first member. The first and second members are relatively movable with respect to each other such that they can be pivotally moved with respect to each other so as to easily encompass exhaust tubing and then pivoted together around the exhaust tubing such that the straight threaded portion of the second member extends through the second loop of the first member so that an internally threaded member such as a nut can be screwed down on the externally threaded straight end of the second member to whatever tightness is required to provide the proper clamping on the exhaust tubing.

An object of the present invention is to provide an improved muffler or exhaust clamp.

Another object of the invention is to provide a clamp which can be manufactured easily and economically.

A further object of the invention is to provide a clamp which can be manufactured with little or no scrap or waste produced.

Still another object is to provide a clamp which is reliable in its performance to hold exhaust tubing together in a substantially sealed fashion.

A still further object of the invention is to provide a clamp which can be easily and expeditiously installed.

Other objects, advantages and novel features of the present invention will become apparent from the following detailed description of the invention when considered in conjunction with the accompanying drawings.

BRIEF DESCRIPTION OF THE DRAWINGS

FIG. 1 shows a perspective view of the clamp of the present invention;

FIG. 2 is a plan view of the clamp shown in FIG. 1;

FIG. 3 is a side elevational view of the clamp shown in FIG. 1;

FIG. 4 is a view showing the lefthand side of the clamp as viewed in FIG. 3;

FIG. 5 is a view of the righthand side of the clamp as shown in FIG. 3;

FIG. 6 is a bottom view of the clamp shown in FIG. 3; and

FIG. 7 is a view like FIG. 4 but showing the clamp installed so as to clamp telescoping portions of exhaust tubing together.

DESCRIPTION OF THE PREFERRED EMBODIMENT

Referring now to the drawings wherein like reference numerals designate identical or corresponding parts throughout the several views, FIG. 1 shows a clamp 10 constructed in accordance with the present invention. The clamp 10 is comprised of a first member 11, a second member 12 and a nut member 13.

The first and second members 11 and 12 are formed of a wire or rod-like material having a substantially constant diameter in cross section along the length thereof. The first member 11 has a partially circular loop 14 on one end thereof formed about a first axis and a second partially circular loop 15 on the other end thereof formed about a second axis which is perpendicular to the first axis of the loop 14. An intermediate portion 16 of the first member 11 is bent generally into a partially circular configuration, the diameter of which is determined by whatever diameter of tubing for which it is to be used.

The second member 12 has one end 17 of a partially circular configuration. This end 17 is not as complete of a loop as the loop 14 so that it can easily be placed through the loop 14 or removed from the loop 14 as desired. The other end 18 of the second member 12 is straight and is externally threaded, while the intermediate portion 19 of the second member 12 is partially circular in shape and is bent in the same general diameter as the intermediate portion 16 of the first member 11.

It is noted that the intermediate portions 16 and 19 respectively of the first and second members 11 and 12 (FIG. 4) are directly in alignment or generally are formed in a common plane so that in use the forces exerted will be directly aligned and be exerted radially inwardly substantially in such common plane.

A nut 13 is provided for engagement with the threaded portion 18 of the second member as will be explained below.

In operation, two sections of tubing 20 and 21 are telescoped together as shown in FIG. 7 such that they overlap somewhat as is well known. The clamp 10 is then placed around the outermost portion of the telescoping tubing by loosening the nut 13 and allowing the first and second members 11 and 12 to pivot outwardly with respect to each other about the hinge structure formed by the loops 14 and 17. The clamp 10 is then placed around the tubing such that the straight portion 18 of the second member 19 extends again through the loop 15 of the first member 11. The nut 13 is then screwed onto the threaded portions 18 and tightened down to whatever tightness is required to obtain optimum clamping pressure on the tubing sections 20 and 21.

Accordingly, it can easily be appreciated that the preferred embodiment of the clamp shown is indeed simple to manufacture and install and does indeed accomplish all of the objects referred to above. Obviously, many modifications and variations of the present invention are possible in light of the above teachings. It is therefore to be understood that, within the scope of the appended claims, the invention may be practiced otherwise than as specifically described.

I claim:
1. A clamp comprising:
a first member being circular in cross-sectional shape along substantially every point along the length thereof, said first member including a partially circular loop on one end thereof formed about a first axis and a second partially circular loop disposed on the other end thereof and formed about a second axis, said second axis being perpendicular to said first axis, and an intermediate portion of said first member being partially circular in shape, said intermediate portion being formed about a third axis which is parallel to the first axis but transverse with respect to the second axis;
a second member being circular in cross-sectional shape along substantially every point along the length thereof, said second member having one end thereof of a partially circular configuration formed about a fourth axis, said one end of said second member extending through the partially circular loop on the one end of the first member whereby a hinge is formed between the first and second members, the other end of said second member being straight and having threads formed about the periphery thereof, said straight end being adapted to be selectively receivable through the partially circular loop in the other end of the said first member, and an intermediate portion of said second member being partially circular in shape and being bent to a diameter identical to the diameter of the diameter of the intermediate portion of said first member; and
internally threaded means adapted to be engaged with the threads of the other end of the second member.

* * * * *